(12) United States Patent
Loganathan et al.

(10) Patent No.: US 10,282,375 B2
(45) Date of Patent: May 7, 2019

(54) ANALYZING USER INTERACTIONS WITH A VIDEO

(71) Applicant: Microsoft Technology Licensing, LLC, Redmond, WA (US)

(72) Inventors: Sivakumar Loganathan, Sunnyvale, CA (US); Deepak Ponraj, Fremont, CA (US); Puneet Sethi, Santa Clara, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 361 days.

(21) Appl. No.: 14/978,394

(22) Filed: Dec. 22, 2015

(65) Prior Publication Data

US 2017/0177718 A1     Jun. 22, 2017

(51) Int. Cl.
| | | |
|---|---|---|
| *G06F 17/30* | (2006.01) | |
| *G06F 7/00* | (2006.01) | |
| *G06F 16/735* | (2019.01) | |
| *G06F 16/78* | (2019.01) | |
| *G06F 16/9032* | (2019.01) | |
| *H04L 29/08* | (2006.01) | |

(52) U.S. Cl.
CPC ............ *G06F 16/735* (2019.01); *G06F 16/78* (2019.01); *G06F 16/90324* (2019.01); *H04L 67/22* (2013.01)

(58) Field of Classification Search
CPC ......... G06F 17/30828; G06F 17/30817; H04L 43/04; H04L 67/02; H04L 65/80; H04L 43/06
USPC ........................................................ 707/776
See application file for complete search history.

(56) References Cited

U.S. PATENT DOCUMENTS

| | | | |
|---|---|---|---|
| 8,055,655 B1 * | 11/2011 | He ..................... | G06F 17/30867 707/727 |
| 9,031,382 B1 * | 5/2015 | Kaiser ................... | G11B 27/00 386/248 |
| 2016/0063881 A1 * | 3/2016 | Brinton .................... | G09B 7/00 434/353 |

* cited by examiner

*Primary Examiner* — Kuen S Lu
(74) *Attorney, Agent, or Firm* — Hickman Palermo Becker Bingham LLP; Daniel D. Ledesma

(57) ABSTRACT

Techniques are provided for aggregating data about multiple user interactions with a media (video or audio) item and analyzing the aggregated data. Based on the analysis, a recommendation and/or a report may be generated. Alternatively, one or more changes are automatically made to the media item. A recommendation indicates how the media item may be improved. The recommendation may indicate where the media item should be modified. The recommendation is then provided to a creator of the media item. A report indicates where within the media item different user interactions are occurring. If a change is automatically made to a media item, then a report may be generated that indicates a difference between user interactions before the change and after the change.

36 Claims, 3 Drawing Sheets

ANALYZING USER INTERACTIONS WITH A VIDEO

TECHNICAL FIELD

The present disclosure relates to tracking user interactions with video and, more specifically, to analyzing the user interactions to generate recommendations for an author of the video.

BACKGROUND

The Internet has facilitated the wide distribution and consumption of video. Authors of video have a sense of how popular their respective videos are based on different metrics that may be tracked, such as a number of HTTP requests for a video, a number of social network "likes" of a video, and a number of comments that are stored in association with a video. However, very limited information is known about how viewers interaction with a video. Therefore, video authors may naturally presume that all content within a video is of equal value.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for analyzing user interactions with a video item and, based on the analysis, generating a recommendation regarding how to improve the video item, and providing the recommendation to a content creator. In one approach, user interaction data pertaining to a video item is received from multiple client devices and analyzed to generate aggregated data. The aggregated data is analyzed to determine whether one or more portions of the video item should be modified. If so, then a recommendation that identifies the one or more portions is generated and provided to a content creator of the video item. Alternatively, the one or more portions are changed automatically. In such an approach, a difference between user interactions before the change and after the change is determined and reported.

While the following description is in the context of video items, embodiments are also applicable to audio items.

System Overview

Figure 1:
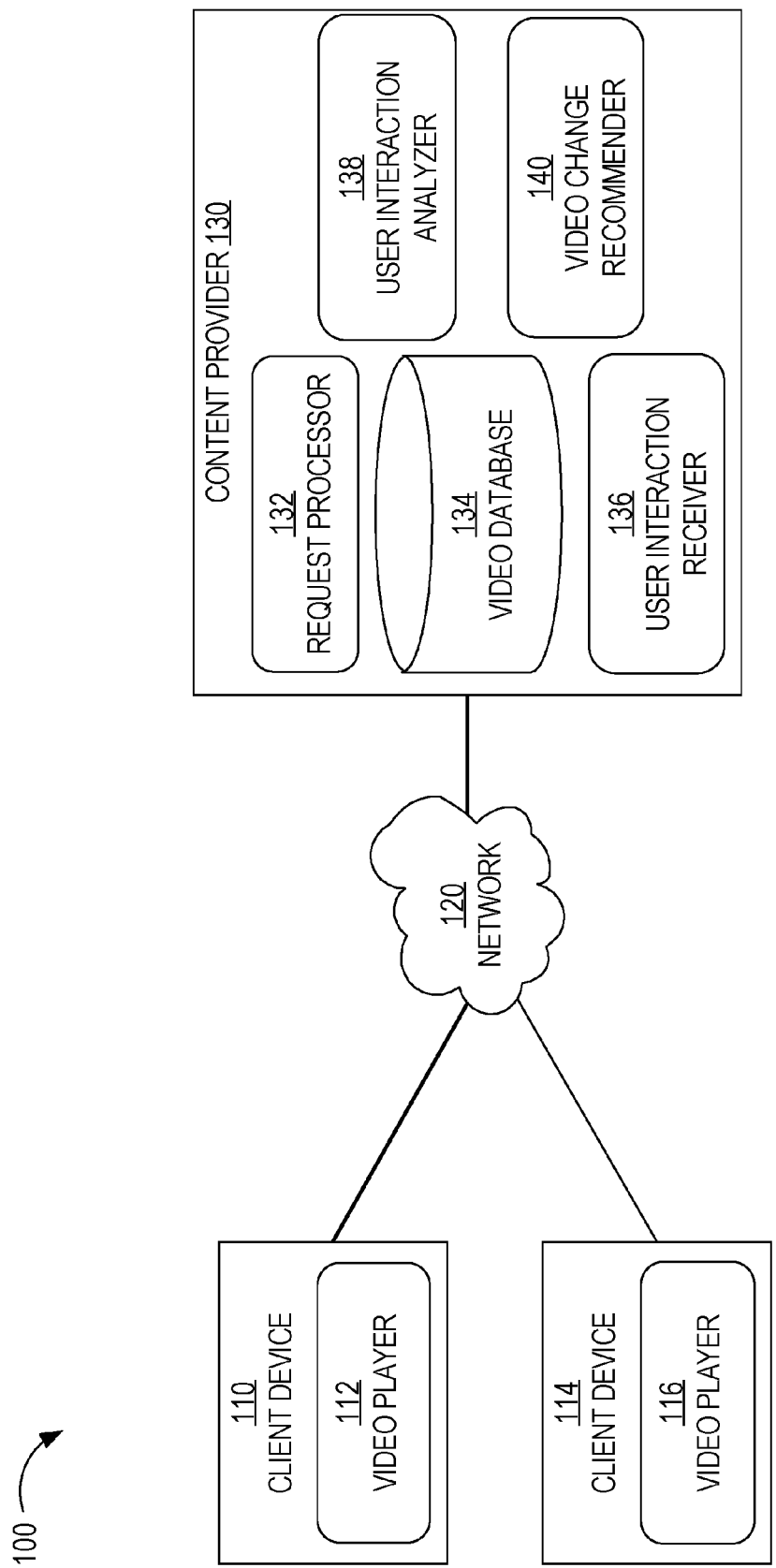
FIG. 1 is a block diagram that depicts an example system for retrieving and analyzing user interactions with one or more video items, in an embodiment.

FIG. 1 is a block diagram that depicts an example system 100 for retrieving and analyzing user interactions with one or more video items, in an embodiment. System 100 includes client devices 110 and 114, network 120, and content provider 130. While only two client devices is depicted, system 100 may include many more client devices that are communicatively coupled to content provider 130 over network 120.

Examples of client devices 110 and 114 include a laptop computer, a tablet computer, a desktop computer, and a smartphone. A client device may include many applications and capabilities that are unrelated to video playing, such as a contacts manager, a web browser, a camera, games, a word processor, a flashlight, etc.

Client device 110 includes a video player 112 (and client device 114 includes a video player 116) that plays video by causing multiple video frames (rendered from video data) to be displayed on a screen of client device 110. Video player 112 may be an application that executes on client device 110 as a stand-alone application. Alternatively, video player 112 executes within a web browser (or another application executing on client device 110) that is used to connect to content provider 130. Alternatively, video player 112 is embedded within an application (e.g., a "mobile" application). In either scenario, video player 112 may read video data (that is stored locally) from one or more video files or receive and play streaming video data from a remote source (e.g., content provider 130).

Video player 112 may be able to process video data that is in only one video file format file or video data that is in multiple file formats. Example file formats include .wmv, .avi, .mov, or .webm formats.

Subsequent references to "video player 112" may include an application that includes multiple software components, among which is a video player component that is configured to process video data and display video.

Video player 112 includes controls to play, stop, pause, rewind, and/or forward video, and, optionally, playback speed (e.g., 1.5× or 2×). The controls may also include controls to adjust parameters, such as brightness and contrast of the displayed video. The controls may also include controls to adjust volume of audio that is played concurrently with the video. While examples provided herein are in the context of video, some embodiments may be limited to just audio, where annotations are stored in association with an audio file and presented at certain points during audio playback.

Network 120 may be implemented on any medium or mechanism that provides for the exchange of data between client device 110 and content provider 130. Examples of network 120 include, without limitation, a network such as a Local Area Network (LAN), Wide Area Network (WAN), Ethernet or the Internet, or one or more terrestrial, satellite or wireless links.

Content Provider

Content provider 130 includes a request processor 132, a video database 134, a user interaction receiver 136, a user interaction analyzer 138, and a video change recommender 140. Each of request processor 132, user interaction receiver 136, user interaction analyzer 138, and video change recommender 140 is implemented in software, hardware, or any combination of software and hardware.

Request processor 132 receives, from client devices 110-114 over network 120, requests for video items stored in video database 134. Examples requests include Hypertext Transfer Protocol (HTTP) requests.

Video database 134 stores one or more video items. Each video item comprises one or more video files that correspond to a single logical video content, i.e., that has a single start time and a single end time. Example video file formats include .webm, .wmv, .ogv, .avi, and .mov. If video database 134 stores multiple video items, then all the video items may be provided by a single entity or party. Alternatively, some video items in video database 134 are provided by one entity or party and other video items in video database 134 are provided by another entity or party. In this scenario, each entity uses content provider 130 as a distribution platform for distributing its respective video items to different users (e.g., operating clients 110-114).

User interaction receiver 136 receives, from client devices 110-114, user interaction data that indicates operations that users of client devices 110-114 performed relative to video data displayed by client devices 110-114. Examples of an individual data item (within the user interaction data) from a particular user include an identity of the particular user, an identity of the client device through which the particular user interacted with a video item, an identity of the video item, a type of video operation that the particular user initiated, a time (within a timeline of the video item) in which the operation was performed or requested, and a duration (depending on the type of video operation).

Types of Interactions

The number and types of interactions that a viewer may initiated (and tracked) with respect to a video item may vary from video player to video player. There are two classes of interactions: video operations that affect playback of a video item and interactions that do not affect playback of a video item. Examples of the latter class of interactions include increasing or decreasing a volume setting (provided by video player 112) during a particular section of a video item, enabling subtitles during a particular section in a video item, zooming in and zooming out, increasing/decreasing brightness and/or contrast, providing a comment or a question relative to a particular point or time interval in a video item, and marking a current playback position. A marking may be a tag or other indicator that may be saved for later perusal or for sharing with other users. A marking may indicate a segment (or a strict subset of video) within a video item or the start of a segment that the viewer found particular interesting or noteworthy.

Examples of video operations that may be performed (and tracked) relative to a video item include stopping playback of the video item, pausing playback of the video item, fast forwarding playback of the video item, rewinding playback of the video item, and closing or exiting a playback environment or window associated with the video item. An example of the latter operation is closing a window that includes a video player that plays the video item. A related operation that a viewer initiates is causing the window that includes the video player to change the displayed content (such as by entering a different URL in a search field of a browser user interface) to display different content (e.g., a web page) from a different domain or different entity than content provider 130.

Creating User Interaction Data Items

When a user of client device 110 provides input that initiates a video operation, then client device 110 generates an event that is used to create a user interaction data item. Initially, a user interaction data item may be created by client device 110 or content provider 130. If created by client device 110, then the user interaction data item is stored locally on client device 110. The data item may be stored in volatile memory or non-volatile memory. User interaction data items may be created by video player 112 or a component or application that is separate from video player 112. Thus, while the following description indicates that video player 112 processes user input to create user interaction data, embodiments are not so limited.

For example, video player 112 detects when a viewer selects a stop button that is displayed by video player 112. In response, video player 112 generates an event that is used to create (immediately or later) a user interaction data item (or "stop data item") that indicates a stop operation was performed.

As another example, video player 112 detects when a viewer moves a current position indicator in a timeline of a video item. The placement of the current position indicator indicates which video data (e.g., which specific frame) to present through video player 112. Thus, while a video item is being playback (whether at normal speed or some other speed), the current position indicator moves. User selection of the current position indicator (e.g., with the viewers finger if client device 110 includes a touchscreen or with a cursor if the viewer is employing a computer mouse) causes a move position event to be generated. When the user deselects the current position indicator, a resume event is generated. In addition to selecting/deselecting the current position indicator, the user may forward or rewind the video by directly tapping (e.g., with a finger or cursor) on a particular position in the video timeline. If the video time associated with the resume event (or "resume time") is later than the video time associated with the move position event (or "move time"), then a forward data item is created, indicating that the viewer skipped a portion of the video item, the portion corresponding to the duration between the two times. The forward data item indicates two or more of the resume time, the move time, or the duration. Conversely, if the resume time is before the move time, then a rewind data item is created, indicating that the viewer rewound a portion of the video item, the portion corresponding to the duration between the two times. The rewind data item indicates two or more of the resume time, the move time, or the duration.

As another example, video player 112 detects when a viewer provides instructions to fast forward through a video item (e.g., provides voice input or selects a fast forward button or other graphical element). The speed of the fast forward operation may be a certain multiple of a normal playback speed, such as 1.5× (or 1.5 times the normal playback speed), 2×, or 8×. In response to the detection, video player 112 generates a start fast forward event that is associated with the current playback position (e.g., video time 4:53). Additionally, video player 112 performs a fast forward operation. Video player 112 detects when the fast forwarding operation ends. For example, a fast forward operation may be preset, such as a 10 second or 20 second fast forward operation that ends after that length of time.

Alternatively, the fast forward operation may cease when the user deselects a fast forward button. Alternatively, the fast forward operation may cease when the user selects the same fast forward button or a different button (which may be displayed in place of the fast forward button while the fast forward operation is being performed). In response to detecting that the fast forwarding operation ends, video player 112 generates an end fast forward event that is associated with the current playback position (e.g., time 5:39). Video player 112 creates a fast forward data item that indicates two or more of the time of the start fast forward event (e.g., 4:53), the time of the end fast forward event (e.g., 5:39), or a duration (e.g., 0:46) of an amount of the video item that was fast forwarded.

As another example, video player 112 detects when a viewer increases and decreases the volume at a particular point in a video item. When a viewer increases the volume, then a volume increase data item is created and is associated with a video time corresponding to when the increase in volume occurred. Conversely, when a viewer decreases the volume, then a volume decrease data item is created and is associated with a video time corresponding to when the decrease in volume occurred. If a volume decrease data item follows an volume increase data item (or vice versa), then the section of the video item between the corresponding two video times may indicate that the sound quality in that section of the video item needs improvement.

In a related embodiment, rather than video player 112 generating user interaction data items, content provider 130 receives, over network 120, events created by video player 112 and generates the user interaction data items. For example, content provider 130 receives a move time and a resume time and generates a rewind data item or a forward data item.

Transmitting User Interaction Data Items

If user interaction data items are generated at client devices 110-114, then the user interaction data items are transmitted to content provider 130 for analysis. A user interaction data item may be transmitted to content provider 130 upon its creation. Alternatively, a user interaction data item is first stored locally and then transferred later, such as when client device 110 has established a connection with content provider 130 or when client device 110 determines that network bandwidth is greater than a particular threshold. If client device 110 buffers multiple user interaction data items (such as those being related to the same video item), then client device 110 may transmit them in a batch of one or more messages.

System Overview (Cont.): Content Provider Components

User interaction receiver 136 organizes user interaction data items according to video item. For example, client device 110 sends two data items related to video item A and client device 114 sends five data items related to video item A. User interaction receiver 136 associates all seven data items with video item A, for example, by storing the seven data items in a table that is associated with video item A. Each separate table or file may store user interaction data items for a different video item stored in video database 134.

User interaction analyzer 138 analyzes the user interaction data to generate aggregated data with respect to individual video items. For example, user interaction analyzer 138 determines that there were one hundred viewers (or viewings) of a video item and that twenty of those viewers stopped viewing the video item between times 2:34 and 2:51 in the video item.

Process Overview

Figure 2:
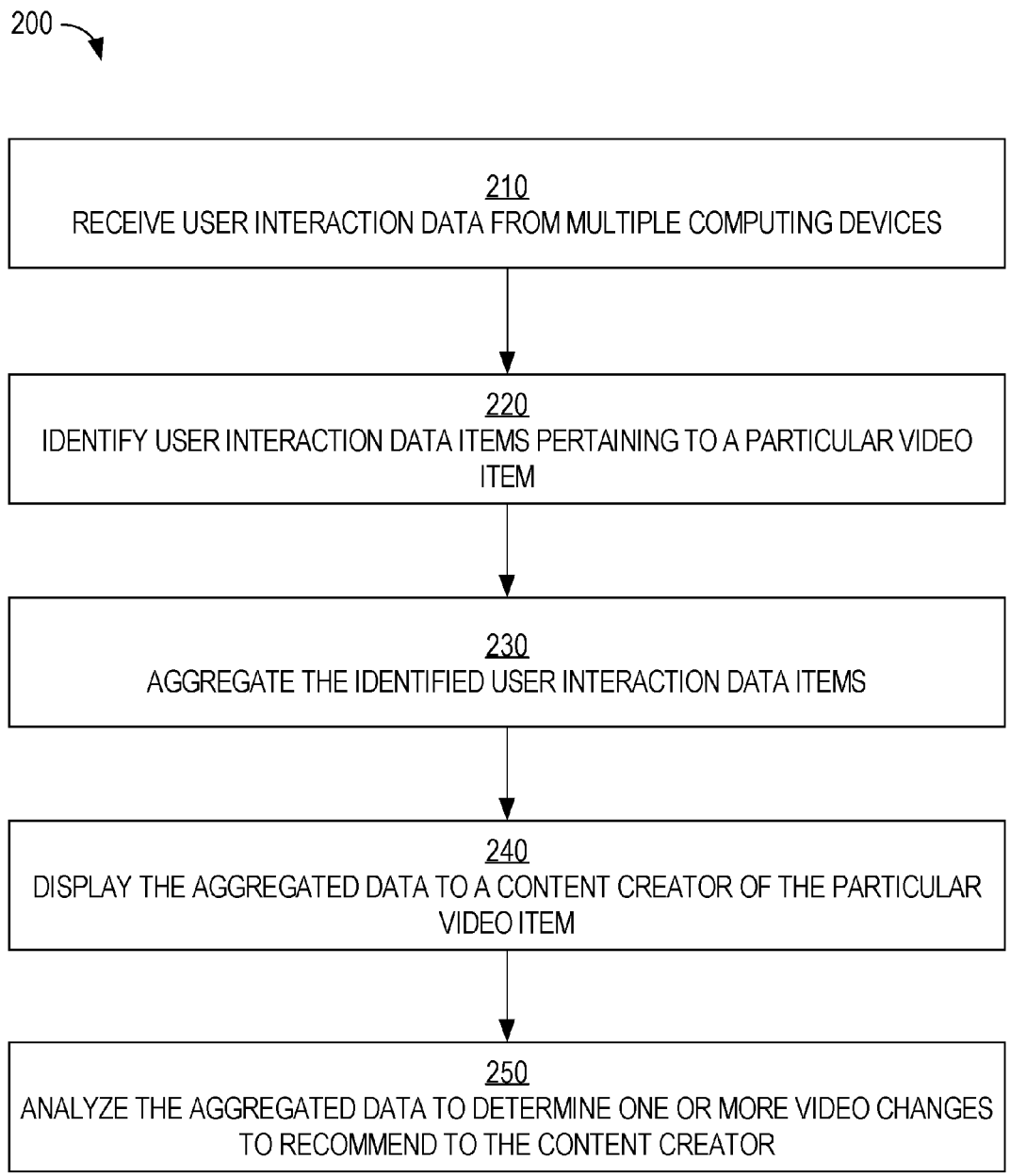
FIG. 2 is a flow diagram that depicts a process for processing user interaction data with respect to a video item, in an embodiment.

FIG. 2 is a flow diagram that depicts a process 200 for processing user interaction data with respect to a video item, in an embodiment. Process 200 may be implemented by content provider 130.

At block 210, user interaction data is received from multiple client devices (e.g., 110-114). The user interaction data may pertain to a single video item or to multiple video items that include a common video item.

At block 220, user interaction data items pertaining to a single video item are identified. Block 220 may involve identifying a common video item identifier that is included in multiple user interaction data items. Thus, block 220 may involve identifying a subset of all user interaction data that content provider 130 stores. Block 220 may be performed automatically prior to receiving any request (e.g., from a content creator of the video item) for reports or recommendations pertaining to the video item.

At block 230, aggregated data about the video item is generated (e.g., by user interaction analyzer 138) based on one or more dimensions, such as time or type of user interaction. Block 230 may involve identifying a number of the user interaction data items (of the video item) that are associated with each type of user interaction. For example, aggregated data based on type of user interaction may indicate that 23 rewinds, 17 pauses, 98 forwards, 54 stops, 61 comments, and 13 markings occurred relative to the video item.

Additionally or alternatively, block 230 may involve identifying a number of interaction data items (of the video item) that are associated with a particular time within the video item or time range within the video item. For example, aggregated data based on time may indicated that 67 video operations were performed between video times 1:21 and 1:42, 43 video operations were performed between video times 4:01 and 4:05, and 39 video operations were performed in the last two minutes of the video item.

Two or three different sets of aggregated data may be generated in block 230: one set of aggregated data based on type of video operation, one set of aggregated data based on time, and one set of aggregated data based on time and type of video operation. Examples of aggregated data in the latter set is that 55 rewind operations ended between video times 2:57 and 3:02 and 35 stop operations were performed between video times 9:43 and 9:49.

At block 240, the aggregated data is displayed to a user, such as a content creator. Block 240 may be performed in response to user input or in response to receiving a request that was initiated by user input. For example, a content creator uses a computing device (e.g., a smartphone) to establish a connection with content provider 130 (or another system that stores the aggregated data) and then initiates a request that content provider 130 processes, wherein the request includes data that identifies (or is associated with) a particular video item and/or the content creator. This data is used to identify the appropriate video item(s).

Alternatively, block 240 may be performed automatically, such as daily, weekly, or detecting when one or more delivery criteria are satisfied. Example delivery criteria include a certain number of users who requested or viewed at least a portion of the video item, a certain percentage (or number) of viewers who initiated a rewind operation, a certain percentage (or number) of viewers who stopped viewing the video item before the 10 minute mark, and/or a certain percentage (or number) of viewers who initiated a fast forward operation after the mid-point of the video item. Delivery criteria may be defined by the content creator of the video item. Additionally or alternatively, an operator of content provider 130 defines the delivery criteria. Thus, delivery criteria may be applied to multiple video items and even to video items from different content creators.

Optionally, at block 250, the aggregated data is analyzed to determine one or more changes to the video item to recommend to the content creator of the video item. Block 250 may be performed prior to block 240 and the one or more recommended changes are provided, along with the aggregated data, in block 240.

In a related embodiment, instead of or in addition to blocks 240 and 250, process 200 comprises identifying one or more portions of a video item and automatically modifying those one or more portions. Automatic modifications are described in more detail below.

Examples of Aggregated Data

User interaction analyzer 138 may generate one of many types of aggregated data based on user interaction data items associated with a particular video item. Examples of aggregated data include a total number of video operations that were performed by viewers of the particular video item; a total number of each type of video operation that were performed relative to the particular video item; a percentage of viewers who performed any video operation with respect to the particular video item; for each type of video operation, a percentage of viewers who performed that type of operation relative to the particular video item.

Some of the above example metrics may be used at a finer time granularity. Thus, instead of (or in addition to) calculating the number of interactions (e.g., video operations) that occurred with respect to a video item as a whole, the number of interactions that were performed with respect to different time durations or intervals within the particular video item is calculated. For example, a video item may be logically divided in 10 second intervals. User interaction analyzer 138 calculates, for each 10 second interval, a number of comments that were associated with that 10 second interval, a number of fast forward operations that began in that 10 second interval, a number of rewind operations that ended in that 10 second interval, a number of stop operations that began in that 10 second interval.

The length of time intervals may be a default or pre-defined setting. Alternatively, a content creator may provide input that increases or decreases the length of the time interval, which, in turn, causes a different set of aggregated data to be generated based on the same set of user interaction data items.

Additionally or alternatively, user interaction analyzer 138 identifies non-uniform time intervals during which certain interactions occurred. For example, user interaction analyzer 138 determines that 73% of all comments that are associated with the video item were associated within video times 4:42 and 4:47. Pre-defined percentages or numbers may be used to identify time ranges. For example, user interaction analyzer 138 may determine time ranges, within a video item, where 25% of rewind operations occurred, 50% of rewind operations occurred, and 90% of rewind operations occurred.

Analysis: Rewinding

In some cases, rewinding a current playback position to a previous playback position (e.g., from video time 4:31 to video time 2:56) may be indicative that the video segment between those two positions (referred to herein as a "rewind segment") is unclear or confusing, thus necessitating the rewind operation. However, in other cases, rewinding may indicate that the rewind segment has positive qualities, such as being interesting, engaging, humorous, or entertaining.

In order to distinguish "good" rewind segments from "bad" ones, other user interaction data may be considered. For example, some viewers who request a video item may move the current playback position to the beginning of the rewind segment, such as from video time 0:00 to video time 2:56. Such forwarding indicates that those viewers have been apprised of the rewind segment and, thus, skip the beginning to go straight to the beginning of the rewind segment.

As another example, the rewind segment (or beginning thereof) may be associated with viewer comments. The viewers created the comments and caused the comments to be stored in association with a particular playback position within the video item. The comments may include a combination of statements, questions, and answers to those questions. If the comments are primarily statements rather than questions or answers to questions, then user interaction analyzer 136 may determine that the rewind segment is a popular section. Thus, user interaction analyzer 136 may determine not to propose any changes to that section.

As another example, ratings of the video item has a whole may be relatively high, such as 4 out of 5 stars. Thus, the ratings may be used as a factor to determine that the rewind segment is viewed positively by the viewers.

In a related embodiment, video or audio analysis on the rewind segment is performed. For example, if a speech-to-text analyzer analyzes the audio of the rewind segment and is unable to translate the audio or has low confidence in translating the audio, then user interaction analyzer 138 determines that the rewind segment is "bad." Similarly, if a video analyzer analyzes the video of the rewind segment and determines that the video is "grainy" or of low quality, then user interaction analyzer determines that the rewind segment is "bad."

Explicit Feedback from Viewers

In an embodiment, video player 112 presents a question with multiple possible answers in response to detecting a user interaction with respect to a video item. Some types of user interactions may trigger presentation of a question (e.g., rewinds, forwards, stops, questions) while other do not (e.g., comments). A question may be "Was the section you rewound helpful?" with a "Yes" and "No" button available for selection. An example question without Yes/No answers is "Which answer below best explains your reason(s) for forwarding this part of the video. Check all that apply. A. Confusing B. Unhelpful C. Boring D. Repetitive, I already heard this before E. Contains offensive content F. I am in a hurry G. I will watch this part later."

The answers to these questions are stored at content provider 130 in association with the video item with which the viewers were interacting. With explicit user feedback, video change recommender 140 is able to provide more accurate recommendations or reports to content creators of video items that are presented to end-users.

Recommendations

In an embodiment, video change recommender 140 generates, for a video item, one or more change recommendations based on an analysis of aggregated user interaction data. A change recommendation indicates one or more changes that a content creator (or one who is so authorized) can or should make to a video item. The one or more changes are changes that, if implemented, may improve the video item, such as increasing a number of viewers of the video item, increasing the amount of the video item that will be viewed by subsequent viewers, and increasing viewer ratings of the video item.

Examples of change recommendations include removing content from a video item, adding content to a video item, clarifying content, increasing/decreasing volume, and increasing/decreasing contrast or brightness. Each recommendation may also indicate where in a video item the change(s) should be made. This may be indicated by a playback time relative to the beginning of the video item, such as 1:56 or 7:09 or between video times 4:30 and 5:15. For example, a recommendation may be to remove the last 2:41 of a video item (because most users tend to not view that last portion). As another example, a recommendation may be to add, to a video item, content at video time 11:18, which is where a significant percentage of viewers end a rewind operation. As another example, a recommendation may be to clarify or modify audio content (and/or enable subtitles), in a video item, between video times 3:58 and 5:43, which is where a significant number of viewers have subtitles turned on. As another example, a recommendation may be to improve or automatically adjust the brightness of the video in a video item between times 8:12 and 8:43, which is where a significant percentage of viewers increase the brightness (e.g., using a brightness control of their respective video players). As another example, a recommendation may be to improve visual quality of a portion of a video item between times 2:34 and 7:21, which is where a significant number of viewers employ a zoom-in button (e.g., on their respective video players).

A recommendation is transmitted from content provider 130 to a computing device (not depicted) operated by a content creator or representative thereof. Content provider 130 stores contact data that identifies the computing device or an account associated with the content creator. For example, the contact data may be a mobile phone number, an email address, or a (e.g., third party) message or storage service. The recommendation may include change information or may include a link that, when selected by a user (e.g., the content creator), causes the change information to be rendered in a window displayed on a screen of the computing device. If a recommendation transmitted to the computing device includes a link, then the recommendation may be more general information while content available at a link in the recommendation may include more detailed information, such as a certain percentage of viewers who initiated a particular user interaction.

A recommendation may be transmitted to an account associated with the content creator or to the computing device automatically when a recommendation is available, automatically on a pre-defined schedule (e.g., every week send a batch of one or more recommendations), or in response to a request (initiated by the content creator) from the computing device.

Estimated Improvements

In an embodiment, a recommendation includes an estimated improvement in the corresponding video item if the corresponding content creator implements the change(s) that the recommendation indicates. Examples of estimated improvements include that a video item's current rating of 3.2 will increase to 4.1, a video item will have ten thousand more views in the next two weeks, an increase of 20% of viewers who will view a video item until the end, and a decrease in 45% of the next week's viewers who will stop viewing the video item altogether.

In a related embodiment, an estimated improvement is in user activity with respect to something different than the video item about which the user interaction data (1) is based and (2) was used to generate the estimated improvement. For example, an estimated improvement (that is based on a video item) is that a number of paid subscriptions for a product or service will increase by two hundred, where the video item is about the product or service.

In an embodiment, an estimated improvement is determined based on past improvements related to changes previously made to the same video item or to different video items. A "past" improvement is based on one or more "prior changes" made to a "prior video item" while an estimated improvement relates to one or more "recommended changes" relative to a "current video item."

A past improvement is calculated based on comparing how users interacted with a prior video item before and after one or more prior changes were made to the prior video item. For example, prior to implementing a particular change, a first video item had a median rating of two stars. After implementing the particular change, the first video item had a median rating of four stars. In this example, the past improvement is a 100% increase in ratings of the first video item or an absolute change of two stars. (The time range of when the ratings were made prior to implementing the prior change(s) may be different than the time range of when the made after implementing the prior change(s), such as two weeks versus one week.)

Which past improvements are considered in calculating an estimated improvement may vary from one video item to another. For example, a particular past improvement may be used to calculate an estimated improvement if a first recommended change is implemented relative to a first video item while two other past improvements are used to calculate an estimated improvement if a second recommended change is implemented relative to a second video item. Example criteria that may be used to select which past improvements to use include the prior change and the current recommended change being of the same type (e.g., both are delete content recommendations or both are add content recommendations), the prior video item and the current video item being from the same content creator, the prior video item and the current video item containing similar content (e.g., both are academically-related, both are sports-related, or both are about computer programming), the prior video item and the current video item being released to the public in the same way (e.g., open completely to the public, limited to only a certain group of users, or only available through paid subscriptions), and/or the prior video item and the current video item being released for viewing within a certain time period of each other (e.g., 10 months).

In a related embodiment, an estimated improvement is determined based on pre-defined rules or heuristics rather than specific past improvements. The pre-defined rules may be manually established based on analysis of prior changes that have been made to the same video item or different video items. A rule may indicate: (1) a particular type of user interaction (e.g., a rewind operation) performed relative to a video item; (2) a number or percentage of viewers (or a number range or percentage range, such as 40%-60%) who initiated the particular type of user interaction; and (3) one or more estimated improvements if a target portion of the video item is modified. For example, for video clippings (where an ending of a video item is deleted or removed) where more than 40% of viewers stopped viewing the video item beginning in the last three minutes, an estimated improvement is a rating increase of 30% if a change is made to the last three minutes. As another example, for forwarding operations where 60% of viewers forwarded through a seven minutes of a middle portion within a video item, an estimate improvement is a rating increase of 45% and an increase in viewing the entirety of a video item is 25% if that seven minutes is removed or the content improved.

Automatic Modifications

In an embodiment, video change recommender 140 (or another component of content provider 130) automatically makes changes to a video item. For example, video change recommender 140 determines that relatively many viewers stop viewing a video item when two minutes are remaining for playback. In response to this determination, video change recommender 140 shortens the video item by removing the last two minutes of the video item. As another example, video change recommender 140 determines that a large percentage of users increase the volume during playback of a particular portion of a video item. In response, video change recommender 140 modifies the video item directly or stores, in association with the video item, volume data (e.g., metadata) that indicates that the particular portion of the video item should be increased by a certain amount during playback of the particular portion. Thereafter, a video player that processes the video item will also process the volume data so that a video player will automatically increase the volume of the audio of the particular portion during playback of the particular portion. As a similar example, video change recommender 140 stores subtitle data that indicates that a video player should include subtitles during a certain portion of an audio item due to many users turning on the subtitle feature during the corresponding audio time.

In a related embodiment, video change recommender 140 (or another component of content provider 130) generates an actual improvement for the video change. To do this, video change recommender 140 retains the original video item (for which user interaction data was received and that user interaction data was used to determine to make a change to the video item) and makes a change to a copy of the original video item. Then, request processor 132 provides the original video item to some requesting users and the modified video item to other requesting users. The modified video item may be provided to a relatively small percentage of subsequent requesting users of the video item, such as 5%. In this way, content provider 130 can determine an effect of a change without jeopardizing the playback experience of a significant number of future requesters of the video item. However, with a large enough pool of "experimental viewers" (i.e., of the automatically modified video item), content provider 130 is able to calculate an improvement in user interaction of the video item before and after the change was made to the video item.

Such A/B testing may be made on one or more of multiple dimensions, such as country of origin, user demographics, device types, etc. Video content recommender 140 determines, for each user interaction data item, a set of attributes associated with the user interaction data item. Examples of attributes include a type of client device that created the data item (e.g., a smartphone, a tablet computer, a laptop computer, desktop computer), a particular OS of the client device, an IP address of the client device (which may be mapped to a particular country or geographic region), and an age/gender/occupation/education level/employment status/job title/job function of the viewer that initiated creation of the data item.

For example, an American author references something in her video that might be unfamiliar to an Asian audience. As a result, Asian viewers tend to skip that portion of the video. Accordingly, the video change recommender 140 determines that viewers from Asian are the primary viewers (e.g., 85% of all Asian viewers) who skip that portion. Video change recommender 140 then automatically identifies the skipped portion (which that includes the reference) for editing only for the Asian audience. By A/B testing the edited video between American and Asian audience, video change recommender 140 may decide to proceed with automatic changes only for users determined to reside in Asia or determined to (e.g. likely) be primarily non-English speakers from Asia.

Another example is that a portion within a video item has very detailed charts that are not suitable for mobile screens causing some viewers to repeatedly rewind and forward. In this example, video change recommender 140 analyzes attributes associated with rewind data items and/or forward data items to identify commonalities and determines that 95% of viewers who rewind/forward at the end/beginning of the video portion are using a smartphone device which tend to have small screen sizes. Accordingly, video change recommender 140 determines (or recommends) to hide that portion of the video item and/or provide a link to bookmark that portion for later viewing on a larger screen. Video change recommender 140 also initiates AB testing such that the video item is edited for client devices with mobile-sized screens, the sizes of which may be deduced based on type of OS, type of client device, and/or type of application that initiated the corresponding user interaction data items.

All these could be automatic changes or could be suggested to the authors with the test results for manual changes.

In an embodiment, regardless of whether a change is made to a video item automatically or in response to user input, content provider 130 generates, for the video item's content creator, a report showing improvement, if any.

User Interaction Reports

In an embodiment, user interaction analyzer 138 (or another component of content provider 130) generates a report that indicates aggregated user interaction data, one or more change recommendations, an actual improvement of an automatic modification, and/or an estimated improvement. Thus, a report includes any combination of the above information items. A report may be provided through similar means described previously with respect to recommendations.

Specifically, a report may list, for a particular video item, one or more of the aggregated data that user interaction analyzer 138 generated, such as the types of user interactions that were performed relative to the particular video, a number of each type of user interaction, when some of the user interactions were performed, and/or one or more portions of the particular video item that are of interest. For example, a report may indicate, for a particular video item, the following information items: (1) there were 1,265 viewers; (2) 823 viewers fast forwarded at least once; (3) 90% of viewers did not view the last three minutes and thirty seconds of the particular video item; (4) 85% of viewers initiated rewind operations that restarted between video times 20:32 and 20:41; and (5) 12% of viewers submitted a question or answer to a question that is associated with a time interval of video times 2:34 to 2:41.

A report may be text only or may additionally include images and/or graphics. For example, a report may include a timeline and individual text descriptions that point to particular points or portions in the timeline. A text description may include information similar to information items (3)-(5) above.

As another example, a timeline is combined with a bar graph that depicts a number of video operations (e.g., of a particular type or regardless of type) that were performed during each of multiple individual time intervals. An individual time interval may vary from a few milliseconds, to 1 second, to 5 seconds, or any other time interval. For example, a timeline is divided into 10 second time intervals. The bar graph may show, for the first 10 second time interval, that no video operations were performed, for the next 10 second time interval, 32 video operations were performed, etc.

A user interface that displays a report that includes a timeline and a bar graph may include a video operation type selector that allows a user to select one of multiple video operation types. When a first type is selected, the bar graph shows a number of video operations of that first type that were performed during each individual time interval. When only a second type is selected, then the bar graph shows a number of video operations of that second type that were performed during each individual time interval. If multiple types are selected, then the bar graph shows a total number of video operations of one of the multiple selected types that were performed during each individual time interval. In this way, the report is dynamic, allowing a person viewing the report to view different types of information at different levels of granularity.

Another way in which a report may be dynamic is a report that allows a user to vary time intervals. For example, a content creator may specify 5 second time intervals and, in response, user interaction data items are re-aggregated based on 5 second time intervals (or such data may have been pre-generated in anticipation of such input).

Report: List of Video Items

In a related embodiment, a report lists a number of video items. The list may be displayed initially before any aggregated data is displayed about a single video item in the list. The video items that are in the list may be video items that are related to the entity (e.g., content creator) that submitted a request (to content provider 130) for the report to be generated. Thus, video items that have been uploaded to content provider 130 by a different content creator will not be identified in the list.

A list of video items may be ordered based on one or more criteria, such as relative popularity (or lack thereof) of each video item, number of viewers of each video item, rating of each video item (e.g., lowest rated video items ranked higher than the highest rated video items), number of video operations initiated relative to each video item, number of "bad" portions of each video item, number of recommendations generated for each video item, and amount of estimated improvement of each video item. For example, video items that are estimated to improve the most if certain changes are implemented are ranked highest, or video items that have the lowest viewer ratings are ranked highest. Each of these criteria may be used to calculate a single score for a video item in the list and the resulting scores are used to rank the list of video items.

Auto-Play Media Items

Some video and audio items are auto-play items where the media is presented automatically, for example, upon loading of a web page. Examples of auto-play media items include advertisements and user-generated content. User interactions with auto-play media items may provide a lot of insight to authors of such media items. Examples of user interactions include a user selecting a maximize button on a video player that plays the auto-play item to cause the video player to go full screen, and a user selecting an "audio on" button to begin listening to audio of a video item. Therefore, embodiments herein are applicable to auto-play media items.

Analytics Across Multiple Videos

In an embodiment, user interaction analyzer 138 analyzes user interactions across multiple video items. For example, content provider 130 provides video items related to an academic course. A video "course" includes multiple "chapters" and each chapter includes one or more video items. User interaction analyzer 138 determines, based on user interaction data of multiple video items in a video course, that there is a significant decrease in the number of viewers from a particular video item in the video course to the next video item in the video course. There may be something about the particular video item that causes viewers to be disinterested in the video course, such as poor instruction, offensive content, lack of interesting content, etc. A first report generated for the video course indicates (or highlights) the decrease, which draws a content creator's attention to the particular video item. The content creator can then select, in the report, a graphical indicator for the particular video item to cause a second (more granular) report regarding the particular video item to be displayed. The second report includes aggregated user interaction data and, optionally, one or more change recommendations and estimated improvements. The second report may show the content creator that 40% of viewers stopped viewing the particular video item before 10% of the particular video item had been played back. The second report may also show that 90% of viewers who continued viewing the particular video went on to view the next video item in the video course. A change recommendation in the second (or a subsequent) report may be to remove a video portion corresponding to between 4% and 10% of playback. An estimated improvement may be that viewer retention from the particular video item to the next video item increases 85%.

Leveraging Data about the Viewers

In an embodiment, aggregated data about viewers themselves is used when providing recommendations or reports to a content creator of a video item. In this embodiment, user interaction analyzer 138 (or another component of content provider 130) identifies demographic, professional, and/or personal interest information about viewers of a video item. Examples of aggregated data about viewers of a video item include: 87% of viewers of the video item have an undergraduate degree, 12% of the viewers are CEOs, 42% of the viewers expressed an interest in soccer, and 29% of the viewers have more than 500 connections.

In a related embodiment, user interaction analyzer 138 generates aggregated data about viewers along a time dimension and/or type of interaction dimension. Examples of such aggregated data include: 31% of viewers who initiated a rewind operation are unemployed, 78% of viewers who initiated any user interaction are male, 65% of all viewers of the video item associated a comment or question within a video segment corresponding to video times 6:07 and 6:18.

Content provider 130 may be part of a social network platform that allows users to create user profiles and establish virtual connections or relationships with other users, resulting in a social graph. In this scenario, video player 112 may send a member identifier for each event or user interaction data item that video player 112 creates and transmits to content provider 130. Alternatively, content provider 130 "knows" the viewer that requested a video item through video player 112 (e.g., because the viewer provided a username and password or client device 110 stores a cookie that is associated with a user profile or account of the viewer) and associates each event or user interaction data item received from video player 112 with that viewer. Therefore, each user interaction data item may include a member or account identifier that uniquely identifies the viewer.

In a related embodiment, content provider 130 sends a user profile request to a third-party service that stores user profile data about a viewer of a video item stored in video database 134. Such a request may be sent whenever a viewer requests a video item or whenever video player 112 sends an event or user interaction data item to content provider 130. Content provider 130 receives the user profile data from the third-party service and stores the data or a member/account identifier in association with the user interaction data items received from video player 112.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
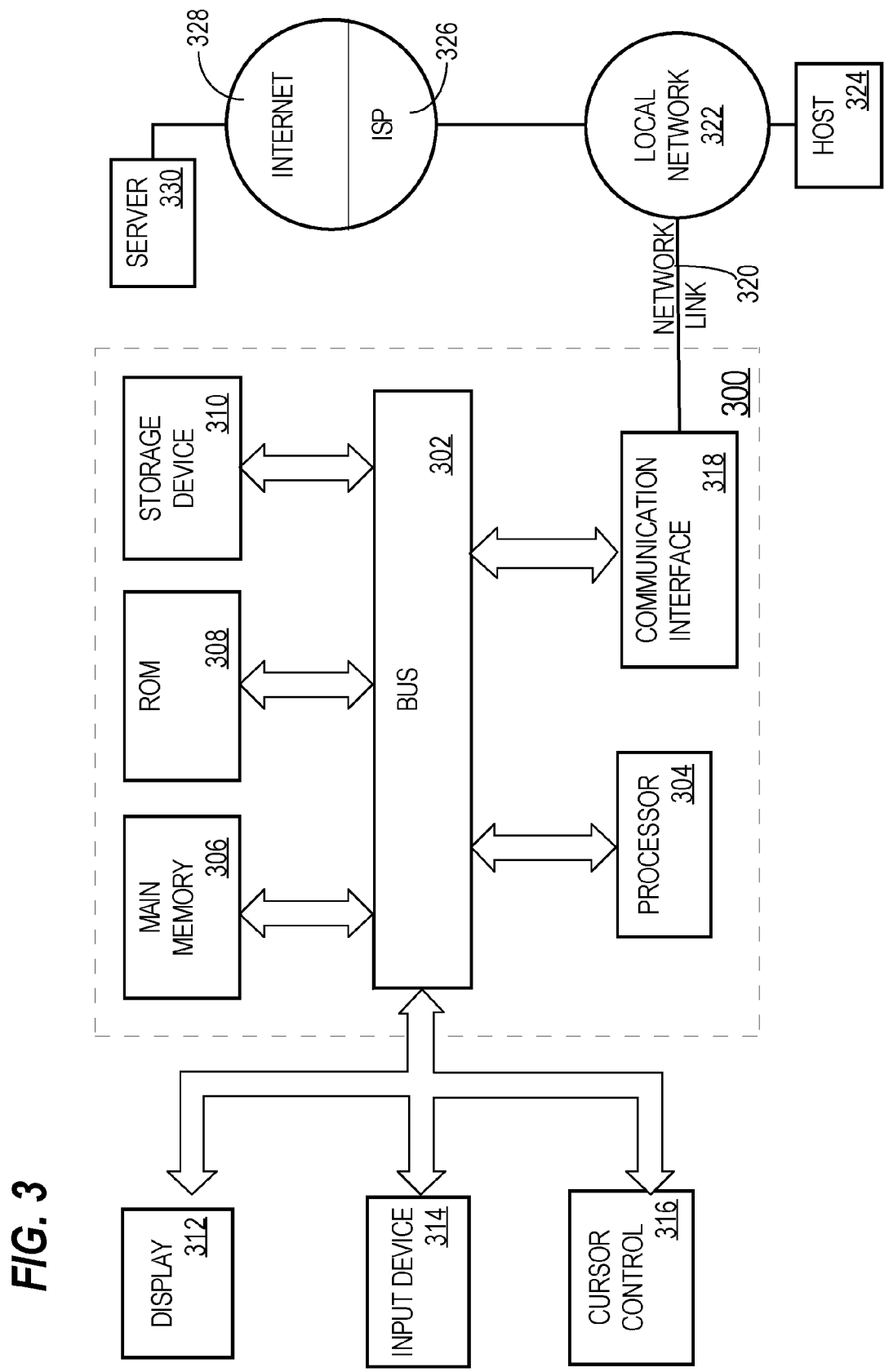
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
one or more processors;
one or more storage media storing instructions which, when executed by the one or more processors, cause:
storing user interaction data that indicates a plurality of interactions;
wherein each interaction in the plurality of interactions is between a different user of a plurality of users and a playback of a video item;
wherein each interaction in the plurality of interactions indicates (a) a time within the video item at which said interaction occurred and (b) a type of interaction from among a plurality of types of interactions;
analyzing the plurality of interactions to generate aggregated data based on the plurality of interactions;
based on the aggregated data, generating a recommendation that indicates a change to make to the video item;
wherein the change indicated by the recommendation is one of deleting an ending portion of the video item, deleting a segment within the video item, adjusting volume at a particular location within the video item, or turning on subtitles at a certain location within the video item.

2. The system of claim 1, wherein the instructions, when executed by the one or more processors, further cause:
identifying, in the plurality of interactions, a first interaction that occurred at a first time in the video item and that indicates a particular type of interaction in the plurality of types of interactions;
identifying, in the plurality of interactions, a second interaction that occurred at a second time in the video item and that indicates the particular type of interaction, wherein the second time is different than the first time;
based on the first time and the second time, storing data that associates the first interaction with the second interaction.

3. The system of claim 2, wherein the instructions, when executed by the one or more processors, further cause:
determining, from the plurality of interactions, a number of interactions that are of the particular type and that occurred, relative to the video item, within a particular time period that includes the first time and the second time.

4. The system of claim 1, wherein:
analyzing the plurality of interactions comprises:
determining a first number of interactions, in the plurality of interactions, of a first type of interaction from among the plurality of types of interactions;
determining a total number of viewers of the video item;
the instructions, when executed by the one or more processors, further cause generating a report that indicates a ratio of the first number and the total number.

5. The system of claim 4, wherein the instructions, when executed by the one or more processors, further cause:
determining a second number of interactions, in the plurality of interactions, of a second type of interaction from among the plurality of types of interactions;
wherein the second type of interaction is different than the first type of interaction;
wherein generating the report comprises generating the report that indicates a second ratio of the second number and the total number.

6. The system of claim 1, wherein the plurality of types of interactions include one or more of: stopping of playback of the video item, rewinding of a current playback position within the video item, pausing of playback of the video item, forwarding of the current playback position within the video item, providing a comment or a question, or a marking of the current playback position.

7. The system of claim 1, wherein:
the video item is a first video item;
the plurality of interactions is a first plurality of interactions;
the user interaction data indicates a second plurality of interactions that is different than the first plurality of interactions;
wherein each interaction in the second plurality of interactions is between a different user of a second plurality of users and a playback of a second video item that is different than the first video item;
the instructions, when executed by the one or more processors, further cause, prior to analyzing the plurality of interactions, identifying, from among the user interaction data, interactions that are associated with the first video item.

8. The system of claim 1, wherein the change indicated by the recommendation is one of adjusting volume at the particular location within the video item or turning on subtitles at the certain location within the video item.

9. The system of claim 1, wherein the recommendation also indicates an estimated improvement in performance of the video item if the video item is modified based on the change.

10. The system of claim 1, wherein the instructions, when executed by the one or more processors, further cause:
based on the aggregated data, automatically modifying the video item to generate a modified video item;
providing the modified video item to a second plurality of users.

11. The system of claim 1, wherein the instructions, when executed by the one or more processors, further cause:
generating a report that indicates a number of interactions, in the plurality of interactions, that occurred within a particular time interval in the video item.

12. The system of claim 1, wherein the change indicated by the recommendation is one of deleting the ending portion of the video item or deleting the segment within the video item.

13. A method comprising:
storing user interaction data that indicates a plurality of interactions;
wherein each interaction in the plurality of interactions is between a different user of a plurality of users and a playback of a video item;
wherein each interaction in the plurality of interactions indicates (a) a time within the video item at which said interaction occurred and (b) a type of interaction from among a plurality of types of interactions;
analyzing the plurality of interactions to generate aggregated data based on the plurality of interactions;
based on the aggregated data, generating a recommendation that indicates a change to make to the video item;
wherein the change indicated by the recommendation is one of deleting an ending portion of the video item, deleting a segment within the video item, adjusting volume at a particular location within the video item, or turning on subtitles at a certain location within the video item;
wherein the method is performed by one or more computing devices.

14. The method of claim 13, further comprising:
identifying, in the plurality of interactions, a first interaction that occurred at a first time in the video item and that indicates a particular type of interaction in the plurality of types of interactions;
identifying, in the plurality of interactions, a second interaction that occurred at a second time in the video item and that indicates the particular type of interaction, wherein the second time is different than the first time;
based on the first time and the second time, storing data that associates the first interaction with the second interaction.

15. The method of claim 14, further comprising:
determining, from the plurality of interactions, a number of interactions that are of the particular type and that occurred, relative to the video item, within a particular time period that includes the first time and the second time.

16. The method of claim 13, wherein:
analyzing the plurality of interactions comprises:
determining a first number of interactions, in the plurality of interactions, of a first type of interaction from among the plurality of types of interactions;
determining a total number of viewers of the video item;
the method further comprising generating a report that indicates a ratio of the first number and the total number.

17. The method of claim 16, further comprising:
determining a second number of interactions, in the plurality of interactions, of a second type of interaction from among the plurality of types of interactions;
wherein the second type of interaction is different than the first type of interaction;
wherein generating the report comprises generating the report that indicates a second ratio of the second number and the total number.

18. The method of claim 13, wherein the plurality of types of interactions include one or more of: stopping of playback of the video item, rewinding of a current playback position within the video item, pausing of playback of the video item, forwarding of the current playback position within the video item, providing a comment or a question, or a marking of the current playback position.

19. The method of claim 13, wherein:
the video item is a first video item;
the plurality of interactions is a first plurality of interactions;
the user interaction data indicates a second plurality of interactions that is different than the first plurality of interactions;
wherein each interaction in the second plurality of interactions is between a different user of a second plurality of users and a playback of a second video item that is different than the first video item;
the method further comprising, prior to analyzing the plurality of interactions, identifying, from among the user interaction data, interactions that are associated with the first video item.

20. The method of claim 13, wherein the change indicated by the recommendation is one of adjusting volume at the particular location within the video item or turning on subtitles at the certain location within the video item.

21. The method of claim 13, wherein the recommendation also indicates an estimated improvement in performance of the video item if the video item is modified based on the change.

22. The method of claim 13, further comprising:
based on the aggregated data, automatically modifying the video item to generate a modified video item;
providing the modified video item to a second plurality of users.

23. The method of claim 13, further comprising:
generating a report that indicates a number of interactions, in the plurality of interactions, that occurred within a particular time interval in the video item.

24. The method of claim 13, wherein the change indicated by the recommendation is one of deleting the ending portion of the video item or deleting the segment within the video item.

25. One or more non-transitory storage media storing instructions which, when executed by one or more processors, cause:
storing user interaction data that indicates a plurality of interactions;
wherein each interaction in the plurality of interactions is between a different user of a plurality of users and a playback of a video item;
wherein each interaction in the plurality of interactions indicates (a) a time within the video item at which said interaction occurred and (b) a type of interaction from among a plurality of types of interactions;
analyzing the plurality of interactions to generate aggregated data based on the plurality of interactions;
based on the aggregated data, generating a recommendation that indicates a change to make to the video item;
wherein the change indicated by the recommendation is one of deleting an ending portion of the video item, deleting a segment within the video item, adjusting volume at a particular location within the video item, or turning on subtitles at a certain location within the video item;
wherein the method is performed by one or more computing devices.

26. The one or more non-transitory storage media of claim 25, wherein the instructions, when executed by the one or more processors, further cause:
identifying, in the plurality of interactions, a first interaction that occurred at a first time in the video item and that indicates a particular type of interaction in the plurality of types of interactions;
identifying, in the plurality of interactions, a second interaction that occurred at a second time in the video item and that indicates the particular type of interaction, wherein the second time is different than the first time;
based on the first time and the second time, storing data that associates the first interaction with the second interaction.

27. The one or more non-transitory storage media of claim 26, wherein the instructions, when executed by the one or more processors, further cause:
determining, from the plurality of interactions, a number of interactions that are of the particular type and that occurred, relative to the video item, within a particular time period that includes the first time and the second time.

28. The one or more non-transitory storage media of claim 25, wherein:
analyzing the plurality of interactions comprises:
determining a first number of interactions, in the plurality of interactions, of a first type of interaction from among the plurality of types of interactions;
determining a total number of viewers of the video item;
wherein the instructions, when executed by the one or more processors, further cause generating a report that indicates a ratio of the first number and the total number.

29. The one or more non-transitory storage media of claim 28, wherein the instructions, when executed by the one or more processors, further cause:
determining a second number of interactions, in the plurality of interactions, of a second type of interaction from among the plurality of types of interactions;
wherein the second type of interaction is different than the first type of interaction;
wherein generating the report comprises generating the report that indicates a second ratio of the second number and the total number.

30. The one or more non-transitory storage media of claim 25, wherein the plurality of types of interactions include one or more of: stopping of playback of the video item, rewinding of a current playback position within the video item, pausing of playback of the video item, forwarding of the current playback position within the video item, providing a comment or a question, or a marking of the current playback position.

31. The one or more non-transitory storage media of claim 25, wherein:
the video item is a first video item;
the plurality of interactions is a first plurality of interactions;
the user interaction data indicates a second plurality of interactions that is different than the first plurality of interactions;
wherein each interaction in the second plurality of interactions is between a different user of a second plurality of users and a playback of a second video item that is different than the first video item;
wherein the instructions, when executed by the one or more processors, further cause, prior to analyzing the plurality of interactions, identifying, from among the user interaction data, interactions that are associated with the first video item.

32. The one or more non-transitory storage media of claim 25, wherein the change indicated by the recommendation is one of adjusting volume at the particular location within the video item or turning on subtitles at the certain location within the video item.

33. The one or more non-transitory storage media of claim 25, wherein the recommendation also indicates an estimated improvement in performance of the video item if the video item is modified based on the change.

34. The one or more non-transitory storage media of claim 25, wherein the instructions, when executed by the one or more processors, further cause:
based on the aggregated data, automatically modifying the video item to generate a modified video item;
providing the modified video item to a second plurality of users.

35. The one or more non-transitory storage media of claim 25, wherein the instructions, when executed by the one or more processors, further cause:
generating a report that indicates a number of interactions, in the plurality of interactions, that occurred within a particular time interval in the video item.

36. The one or more non-transitory storage media of claim 25, wherein the change indicated by the recommendation is one of deleting the ending portion of the video item or deleting the segment within the video item.

\* \* \* \* \*